United States Patent
Luo

(10) Patent No.: US 11,665,778 B2
(45) Date of Patent: May 30, 2023

(54) FUNCTION CONTROLLING METHOD, FUNCTION CONTROLLING DEVICE AND STORAGE MEDIUM

(71) Applicant: BEIJING XIAOMI MOBILE SOFTWARE CO., LTD., Beijing (CN)

(72) Inventor: Zhanwei Luo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 16 days.

(21) Appl. No.: 16/886,326

(22) Filed: May 28, 2020

(65) Prior Publication Data

US 2021/0212166 A1 Jul. 8, 2021

(30) Foreign Application Priority Data

Jan. 3, 2020 (CN) .......................... 202010006591.9

(51) Int. Cl.
*H04W 88/06* (2009.01)
*H04W 4/80* (2018.01)
*H04W 12/106* (2021.01)
*H04W 8/18* (2009.01)

(52) U.S. Cl.
CPC ............. *H04W 88/06* (2013.01); *H04W 4/80* (2018.02); *H04W 8/183* (2013.01); *H04W 12/106* (2021.01)

(58) Field of Classification Search
CPC ... H04W 88/06; H04W 4/80; H04W 12/1006; H04W 8/183; H04W 12/106; G06F 2221/2149; G06F 21/74; G06F 16/901; H04M 2250/60; H04M 1/7243; H04M 1/72436; H04M 1/72448
See application file for complete search history.

(56) References Cited

U.S. PATENT DOCUMENTS

| 2002/0010007 A1* | 1/2002 | Goodings | H04M 1/72403 |
| | | | 455/566 |
| 2012/0173901 A1* | 7/2012 | Soliman | H04W 88/182 |
| | | | 713/320 |
| 2016/0105540 A1* | 4/2016 | Kwon | H04N 21/4312 |
| | | | 715/747 |

FOREIGN PATENT DOCUMENTS

| CN | 107944298 A | 4/2018 |
| CN | 108181980 A | 6/2018 |
| EP | 2469813 A1 | 6/2012 |

OTHER PUBLICATIONS

Extended European Search Report in Application No. 20190376, dated Jan. 22, 2021.

(Continued)

*Primary Examiner* — Dinh Nguyen
(74) *Attorney, Agent, or Firm* — Syncoda LLC; Feng Ma

(57) ABSTRACT

A function controlling method is applied to a terminal provided with a first working mode and a second working mode, and the function controlling method includes: determining currently running function of the terminal, and determining a working mode of the currently running function; controlling the function to run in a first running mode if the current working mode is the first working mode; controlling the function to run in a second running mode if the current working mode is the second working mode; and the first running mode is different from the second running mode. The functions running in different working modes can be isolated from each other.

13 Claims, 3 Drawing Sheets

(56) References Cited

OTHER PUBLICATIONS

CN First Office Action in Application No. 202010006591.9, dated Sep. 30, 2020.
European Paten Office Office Action in Application No. 20190376.2, dated Mar. 29, 2023.

* cited by examiner

FUNCTION CONTROLLING METHOD, FUNCTION CONTROLLING DEVICE AND STORAGE MEDIUM

CROSS-REFERENCE TO RELATED APPLICATION

This application claims priority to Chinese Patent Application No. 202010006591.9 filed on Jan. 3, 2020, the disclosure of which is hereby incorporated by reference in its entirety.

BACKGROUND

As users have more requirements for performance and security of mobile terminals, two or more working modes in operating systems can be set for different application scenarios. Through the set working modes, the application scenarios corresponding to the working modes and the data generated in the working modes can be isolated, thereby ensuring the security of the data running in different working modes.

SUMMARY

The present disclosure relates generally to the field of terminal technologies, and more specifically, to a function controlling method, a function controlling device and a storage medium.

According to a first aspect of embodiments of the present disclosure, there is provided a function controlling method, the method is applied to a terminal provided with a first working mode and a second working mode, and the method includes: determining currently running function of the terminal, and determining a working mode of the currently running function; controlling the function to run in a first running mode if the current working mode is the first working mode; controlling the function to run in a second running mode if the current working mode is the second working mode; and the first running mode is different from the second running mode.

In some embodiments, the function includes: one or more of short message storing, call log storing, function switch setting and network connection channel setting.

In some embodiments, the function includes a short message storing function; controlling the function to run in a first running mode includes: storing a short message in a first short message database associated with the first working mode; controlling the function to run in a second running mode includes: storing a short message in a second short message database associated with the second working mode; and the first short message database is different from the second short message database.

In some embodiments, the function includes a call log storing function; controlling the function to run in a first running mode includes: storing a call log in a first call log database associated with the first working mode; controlling the function to run in a second running mode includes: storing a call log in a second call log database associated with the second working mode; and the first call log database is different from the second call log database.

In some embodiments, the function includes function switch setting; controlling the function to run in a first running mode includes: acquiring a first function switch state recorded by the terminal, and setting a switch state of a function switch in the first working mode to the first function switch state corresponding to the first working mode; and controlling the function to run in a second running mode includes: acquiring a second function switch state recorded by the terminal, and setting a switch state of a function switch in the second working mode to the second function switch state corresponding to the second working mode.

In some embodiments, the function includes network connection channel setting; controlling the function to run in a first running mode includes: setting a first network connection channel, which is a network connection channel used by an application to access the network in the first working mode; controlling the function to run in a second running mode includes: setting a second network connection channel, which is a network connection channel used by an application to access the network in the second working mode.

According to second aspect of embodiments of the present disclosure, there is provided a function controlling device, the function controlling device is applied to a terminal provided with a first working mode and a second working mode, and the device including: a determining unit configured to determine currently running function of the terminal, and to determine a working mode of the currently running function; and a processing unit configured to control the function to run in a first running mode if the current working mode is the first working mode, and to control the function to run in a second running mode if the current working mode is the second working mode; and the first running mode is different from the second running mode.

In some embodiments, the function includes: one or more of short message storing, call log storing, function switch setting and network connection channel setting.

In some embodiments, the function includes a short message storing function; the processing unit controls the function to run in the first running mode by adopting the following manner: storing a short message in a first short message database associated with the first working mode; the processing unit controls the function to run in the second running mode by adopting the following manner: storing a short message in a second short message database associated with the second working mode; and the first short message database is different from the second short message database In some embodiments, the function includes a call log storing function; the processing unit controls the function to run in the first running mode by adopting the following manner: storing a call log in a first call log database associated with the first working mode; the processing unit controls the function to run in the second running mode by adopting the following manner: storing a call log in a second call log database associated with the second working mode; and the first call log database is different from the second call log database.

In some embodiments, the function includes function switch setting; the processing unit controls the function to run in the first running mode by adopting the following manner: acquiring a first function switch state recorded by the terminal, and setting a switch state of a function switch in the first working mode to the first function switch state corresponding to the first working mode; and the processing unit controls the function to run in the second running mode by adopting the following manner: acquiring a second function switch state recorded by the terminal, and setting a switch state of a function switch in the second working mode to the second function switch state corresponding to the second working mode.

In some embodiments, the function includes network connection channel setting; the processing unit controls the function to run in the first running mode by adopting the following manner: setting a first network connection channel, which is a network connection channel used by an application to access the network in the first working mode; and the processing unit controls the function to run in the second running mode by adopting the following manner: setting a second network connection channel, which is a network connection channel used by an application to access the network in the second working mode.

According to a third aspect of embodiments of the present disclosure, there is provided a function controlling device, including: a processor; memory storing processor-executable instructions; wherein the processor is configured to execute the function controlling method according to the first aspect or any of the examples of the first aspect as described above.

According to a fourth aspect of embodiments of the present disclosure, there is provided a non-transitory computer-readable storage medium having stored thereon computer-executable instructions, the function controlling method according to according to the first aspect or any of the examples of the first aspect as described above is executed when the computer-executable instructions are executed by a processor.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Different working modes often cannot be completely isolated after the working modes are switched. For example, with regard to data generated by an application in one working mode, after switching to another working mode, the data generated by the application can also be seen in the other working mode, and the security between the working modes cannot be guaranteed.

Various embodiments of the present disclosure can be applied to a terminal provided with a plurality of working modes. In various embodiments described below, the terminal is sometimes also referred to as a smart terminal device, wherein the terminal can be a mobile terminal, and can also be referred to as a user equipment (UE), a mobile station (MS), etc.

A terminal can be a device providing voice and/or data connection to a user, or a chip provided inside the device, such as a handheld device with a wireless connection function, a vehicle-mounted device with a wireless connection function, and the like.

For example, examples of the terminal can include: a mobile phone, a tablet, a laptop, a handheld computer, a mobile Internet device (MID), a wearable device, a virtual reality (VR) device, an augmented reality (AR) device, a wireless terminal in industrial control, a wireless terminal in unmanned driving, a wireless terminal in remote surgery, a wireless terminal in smart grid, a wireless terminal in transportation security, a wireless terminal in smart city, and a wireless terminal in smart home etc.

Figure 1:
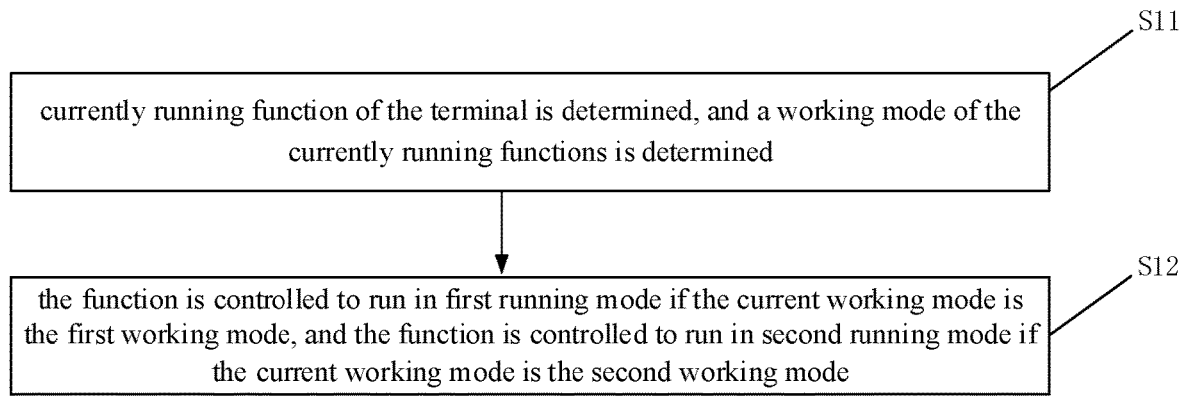
FIG. 1 is a first flowchart of a function controlling method according to some embodiments.

FIG. 1 is a flowchart of a function controlling method shown according to some embodiments, as shown in FIG. 1, the function controlling method is applied to a terminal, the terminal is provided with a first working mode and a second working mode, and the function controlling method includes the following steps.

In step S11, a currently running function of the terminal is determined, and a working mode of the currently running function is determined.

In some embodiments of the present disclosure, the currently running function can be one or more of short message storing, call log storing, function switch setting and network connection channel setting. In some embodiments of the present disclosure, a function corresponding to a working mode can be predetermined for different working modes, and the working mode of the current running function is determined according to the predetermined function corresponding to the working mode.

To distinguish different working modes, the different working modes are respectively represented by a first working mode and a second working mode in some embodiments of the present disclosure.

In step S12, the function is controlled to run in a first running mode if the current working mode is the first working mode, and the function is controlled to run in a second running mode if the current working mode is the second working mode.

In some embodiments of the present disclosure, a running mode of the function corresponding to a working mode can be set for different working modes. After determining the working mode of the currently running function, the terminal is controlled, based on the running mode of the function which is set in the corresponding working mode, to run in the running mode corresponding to the working mode in which the function is.

For convenience of description, in some embodiments of the present disclosure, a running mode corresponding to a function in a first working mode is referred to as a first running mode, and a running mode corresponding to a function in a second working mode is referred to as a second running mode. Herein, the first running mode is different from the second running mode.

In the exemplary embodiments of the present disclosure, by determining the currently running function of the terminal and determining the current working mode of the currently running function, the currently running function is controlled, based on the current working mode of the terminal, to run in the running mode corresponding to the working mode, thereby functions running in different working modes can be isolated from each other.

Figure 2:
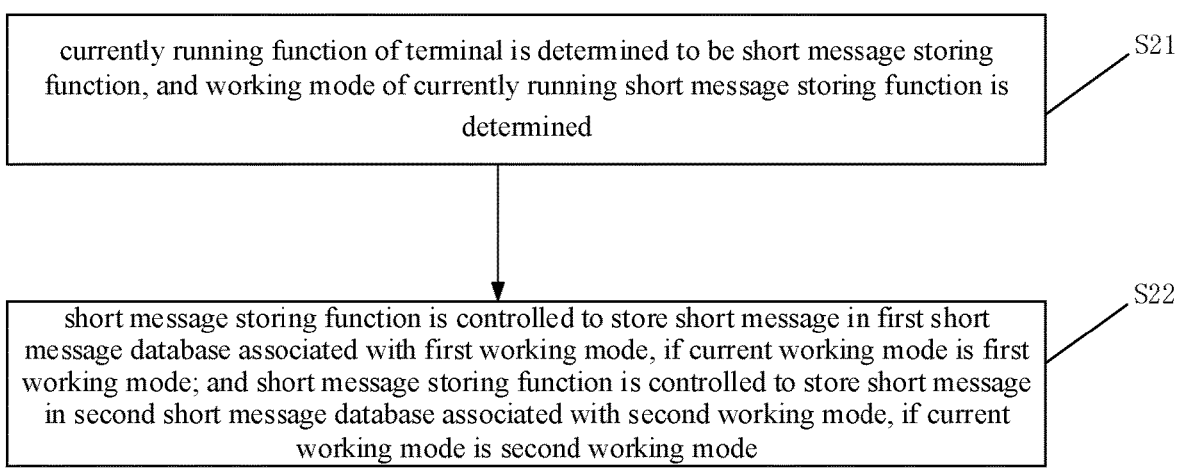
FIG. 2 is a second flowchart of a function controlling method according to some embodiments.

FIG. 2 is a flowchart of a function controlling method shown according to some embodiments, as shown in FIG. 2, the function controlling method is applied to a terminal, the terminal is provided with a first working mode and a second working mode, and the function controlling method includes the following steps.

In step S21, the currently running function of the terminal is determined to be a short message storing function, and a working mode of the currently running short message storing function is determined.

In an implementation, if the currently running function is a function provided by a short message application, a working mode, in which the currently running short message storing function is, is determined, based on a predetermined short message storing function corresponding to the working mode.

In step S22, the short message storing function is controlled to store a short message in a first short message database associated with the first working mode if the current working mode is the first working mode; and the short message storing function is controlled to store a short message in a second short message database associated with the second working mode if the current working mode is the second working mode.

In an implementation, the short message storing function can be controlled to store a short message in a first short message database associated with the first working mode if the working mode of the currently running short message application is the first working mode. The short message storing function can be controlled to store a short message in a second short message database associated with the second working mode if the working mode of the currently running short message application is the second working mode.

Herein, the first short message database and the second short message database can be a predetermined database corresponding to a working mode. Moreover, to distinguish the short message database in the first working mode and the short message database in the second working mode, the short message database associated with the first working mode is referred to as the first short message database, and the short message database associated with the second working mode is referred to as the second short message database.

In the exemplary embodiments of the present disclosure, when the currently running function of the terminal is the short message storing function, the working mode of the currently running short message storing function is determined, the short message storing function is controlled, based on the current working mode of the terminal, to store the short message into the short message database associated with the working mode. Through embodiments of the present disclosure, the isolation of the short messages, in different working modes, from each other can be realized.

Figure 3:
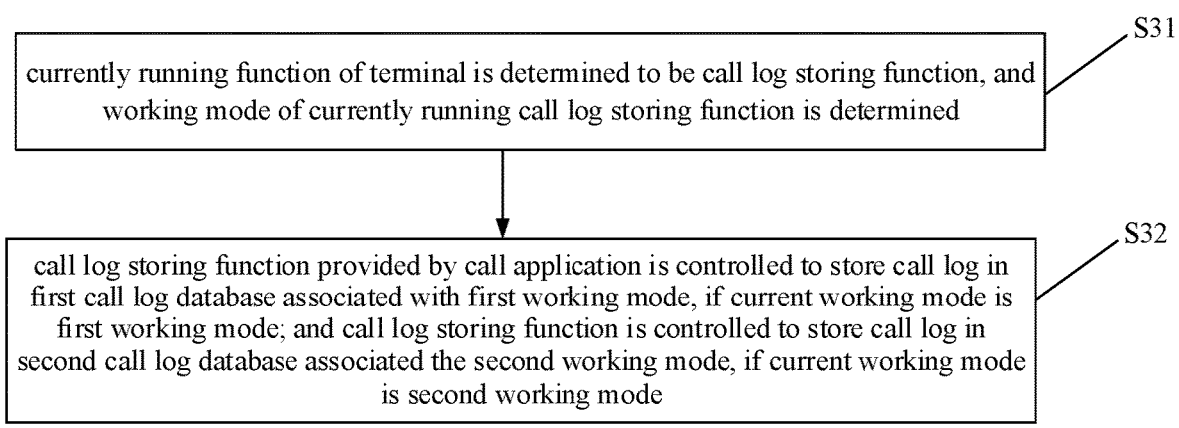
FIG. 3 is a third flowchart of a function controlling method according to some embodiments.

FIG. 3 is a flowchart of a function controlling method shown according to some embodiments, as shown in FIG. 3, the function controlling method is applied to a terminal, the terminal is provided with a first working mode and a second working mode, and the function controlling method includes the following steps.

In step S31, the currently running function of the terminal is determined to be a call log storing function, and a working mode of the currently running call log storing function is determined.

In an implementation, if the currently running function is a call log storing function provided by a call application, a working mode of the currently running call log storing function is determined based on a predetermined call log storing function corresponding to the working mode.

In step S32, the call log storing function provided by a call application is controlled to store a call log in a first call log database associated with the first working mode if the current working mode is the first working mode; and the call log storing function is controlled to store a call log in a second call log database associated with the second working mode if the current working mode is the second working mode.

In an implementation, the call log storing function can be controlled to store a call log in a first call log database associated with the first working mode if the working mode of the currently running call application is the first working mode. The call log storing function can be controlled to store a call log in a second call log database associated with the second working mode if the working mode of the currently running call application is in is the second working mode.

Herein, the first call log database and the second call log database can be a predetermined database corresponding to a working mode. Moreover, in order to distinguish the call log database in the first working mode and the call log database in the second working mode, the call log database associated with the first working mode is referred to as the first call log database, and the call log database associated with the second working mode is referred to as the second call log database.

In the exemplary embodiments of the present disclosure, when the currently running function of the terminal is the call log storing function, the working mode of the currently running call log storing function is determined, the call log storing function is controlled, based on the current working mode of the terminal, to store the call log into the call log database associated with the working mode. Through embodiments of the present disclosure, the isolation of the call logs, in different working modes, from each other can be realized.

Figure 4:
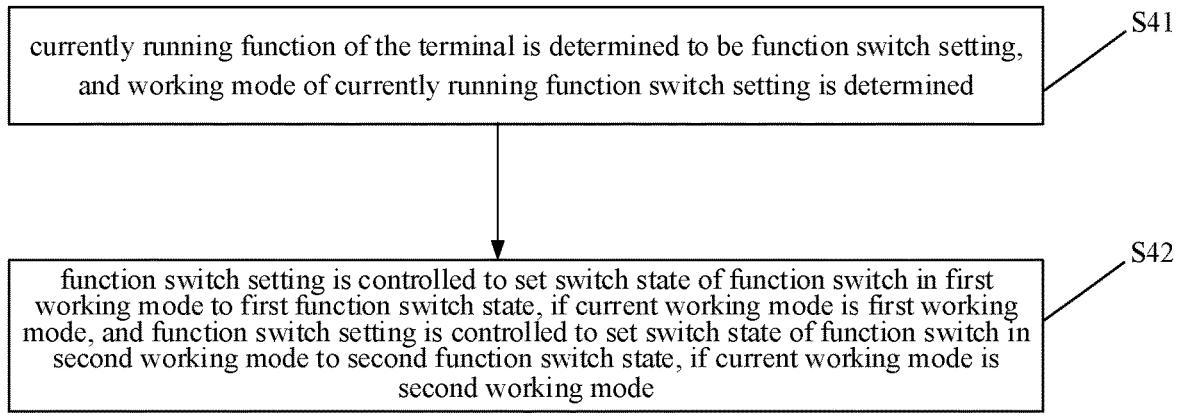
FIG. 4 is a fourth flowchart of a function controlling method according to some embodiments.

FIG. 4 is a flowchart of a function controlling method shown according to some embodiments, as shown in FIG. 4, the function controlling method is applied to a terminal, the terminal is provided with a first working mode and a second working mode, and the function controlling method includes the following steps.

In step S41, the currently running function of the terminal is determined to be function switch setting, and a working mode of the currently running function switch setting is determined.

In an implementation, if the currently running function is function switch setting, such as Bluetooth switch setting, data flow switch setting, global positioning system (GPS) switch setting, etc., the working mode of the currently running function switch setting is determined based on predetermined function switch setting corresponding to the working mode.

In step S42, the function switch setting is controlled to set a switch state of the function switch in the first working mode to a first function switch state if the current working mode is the first working mode, and the function switch setting is controlled to set a switch state of the function switch in the second working mode to a second function switch state if the current working mode is the second working mode.

In some embodiments of the present disclosure, after a working mode of the currently running function switch setting of the terminal is determined based on the currently running function switch setting, a function switch state in the current working mode recorded by the terminal is acquired, and based on the function switch state in the current working mode, the switch state of the function switch is set to the function switch state in the current working mode. Herein, the switch state of the function switch can include a switched-on state or a switched-off state.

Herein, in order to distinguish the function switch states in the first working mode and the second working mode, the function switch state corresponding to the first working mode is referred to as a first function switch state, and the function switch state corresponding to the second working mode is referred to as the second function switch state.

For example, the current working mode is the first working mode, the currently running function switch setting is Bluetooth switch setting, and the state of the Bluetooth switch in the first working mode recorded by the terminal is acquired as a switched-on state. Based on the switched-on state of Bluetooth in the first working mode, the switch state of the Bluetooth switch is set to the switched-on state of Bluetooth in the first working mode. After the working mode is switched from the first working mode to the second working mode, the Bluetooth switch state in the second working mode recorded by the terminal is acquired, based on the Bluetooth switched-on state in the second working mode, the switch state of the Bluetooth switch is set to the Bluetooth switched-on state in the second working mode. Herein, the second function switch state corresponds to the second working mode.

In the exemplary embodiments of the present disclosure, when the currently running function of the terminal is the function switch setting, the working mode of the currently running function switch setting is determined, and the switch state of the function switch is set, based on the function switch state in the current working mode, to the function switch state in the current working mode, thereby the states of the functioning items in different working modes are controlled. Through embodiments of the present disclosure, the states of the functional item in different working modes can be isolated from each other.

Figure 5:
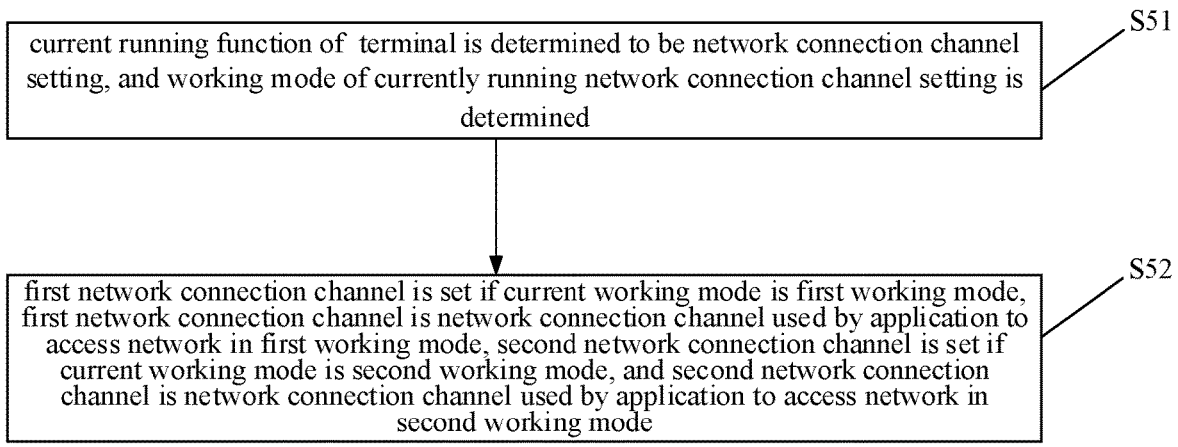
FIG. 5 is a fifth flowchart of a function controlling method according to some embodiments.

FIG. 5 is a flowchart of a function controlling method shown according to some embodiments, as shown in FIG. 5, the function controlling method is applied to a terminal, the terminal is provided with a first working mode and a second working mode, and the function controlling method includes the following steps.

In step S51, the current running function of the terminal is determined to be network connection channel setting, and the working mode of the currently running network connection channel setting is determined.

In an implementation, if the currently running function is network connection channel (Access Point Name, APN) setting, the working mode of the currently running network connection channel setting is determined based on the predetermined network connection channel setting corresponding to the working mode.

For example, it can be predetermined that one workspace uses a dedicated APN and another workspace uses an Internet-type APN.

In step S52, the first network connection channel is set if the current working mode is the first working mode, the first network connection channel is a network connection channel used by an application to access the network in the first working mode, a second network connection channel is set if the current working mode is the second working mode, and the second network connection channel is a network connection channel used by an application to access the network in the second working mode.

In some embodiments of the present disclosure, if the working mode corresponding to the currently running APN setting is the first working mode, it can be set as a network connection channel used by the application to access the network in the first working mode. If the working mode corresponding to the currently running APN setting is the second working mode, it can be set as the network connection channel used by the application to access the network in the second working mode.

Further, when the application accesses the network, the working mode of the application can be identified by user identification (UID) of the application, and the network connection channel corresponding to the working mode is connected based on the working mode of the application.

Therefore, a network connection channel corresponding to the first working mode can be connected when the application in the first working mode accesses the network, and a network connection channel corresponding to the second working mode can be connected when the application in the second working mode accesses the network.

Herein, to distinguish the network connection channel in the first working mode and the network connection channel in the second working mode, the network connection channel corresponding to the first working mode is referred to as a first network connection channel, and the network connection channel corresponding to the second working mode is referred to as the second network connection channel.

In the exemplary embodiments of the present disclosure, when the currently running function of the terminal is APN setting, the working mode of the currently running network connection channel setting is determined, and APN is set to the APN corresponding to the current working mode based on the corresponding APN in the current working mode. Through embodiments of the present disclosure, APN can be isolated from each other in different working modes.

Based on the same inventive concept, the present disclosure further provides a function controlling device.

It can be understood that, in order to achieve the above functions, the function controlling device provided by the embodiments of the present disclosure includes hardware structures and/or software modules corresponding to respective functions. In connection with the units and algorithm steps of respective examples disclosed in the embodiments of the present disclosure, the embodiments of the present disclosure can be implemented in the form of hardware or a combination of hardware and computer software. Whether a certain function is performed by hardware or computer software-driven hardware depends on the specific application and design constraints of the technical solutions. Those skilled in the art can use different methods to implement the described functions for each specific application, but such implementation should not be considered to go beyond the scope of the technical solutions of the embodiments of the present disclosure.

Figure 6:
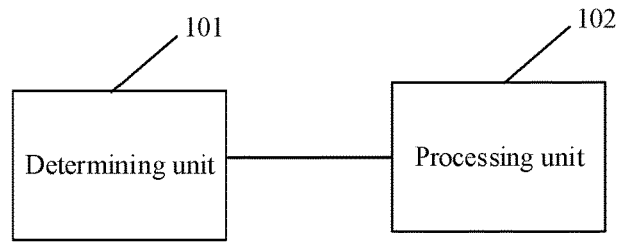
FIG. 6 is a block diagram of a function controlling device according to some embodiments.

FIG. 6 is a block diagram of a function controlling device 100 shown according to some embodiments. Referring to FIG. 6, the function controlling device 100 is applied to a terminal, the terminal is provided with a first working mode and a second working mode, and the function controlling device 100 include: a determining unit 101, and a processing unit 102.

Herein, the determining unit is configured to determine a currently running function of the terminal, and to determine a working mode of the currently running function. The processing unit is configured to control the function to run in a first running mode if the current working mode is the first working mode and to control the function to run in a second running mode if the current working mode is the second working mode; and the first running mode is different from the second running mode.

In an example, the function includes: one or more of short message storing, call log storing, function switch setting and network connection channel setting.

In an example, the function includes a short message storing function; the processing unit 102 controls the function to run in the first running mode by adopting the following manner: storing a short message in a first short message database associated with the first working mode; the processing unit 102 controls the function to run in the second running mode by adopting the following manner: storing a short message in a second short message database associated with the second working mode; and the first short message database is different from the second short message database.

In an example, the function includes a call log storing function; the processing unit 102 controls the function to run in the first running mode by adopting the following manner: storing a call log in a first call log database associated with the first working mode; the processing unit 102 controls the function to run in the second running mode by adopting the following manner: storing a call log in a second call log database associated with the second working mode; and the first call log database is different from the second call log database.

In an example, the function includes function switch setting; the processing unit 102 controls the function to run in the first running mode by adopting the following manner: acquiring a first function switch state recorded by the terminal, and setting a switch state of a function switch in the first working mode to the first function switch state, the first function switch state corresponding to the first working mode; and the processing unit 102 controls the function to run in the second running mode by adopting the following manner: acquiring a second function switch state recorded by the terminal, and setting a switch state of a function switch in the second working mode to the second function switch state, the second function switch state corresponding to the second working mode.

In an example, the function includes network connection channel setting; the processing unit 102 controls the function to run in the first running mode by adopting the following manner: setting a first network connection channel, the first network connection channel being a network connection channel used by an application to access the network in the first working mode; and the processing unit 102 controls the function to run in the second running mode by adopting the following manner: setting a second network connection channel, the second network connection channel being a network connection channel used by an application to access the network in the second working mode.

With respect to the devices in the above embodiments, the specific manners for individual modules to perform operations therein have been described in detail in the embodiments regarding the methods, which will not be elaborated herein.

Figure 7:
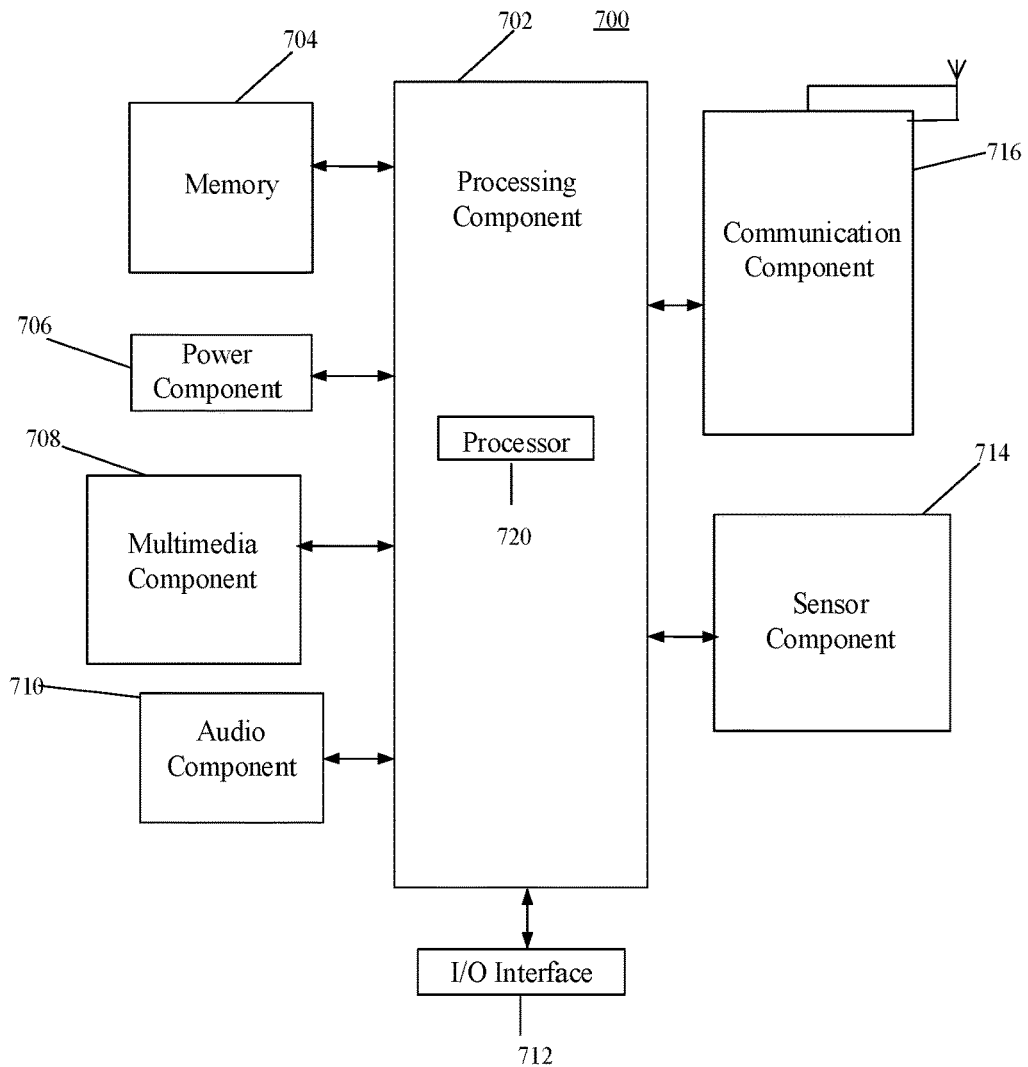
FIG. 7 is a block diagram of a terminal according to some embodiments.

FIG. 7 is a block diagram of a function controlling device 700 shown according to some embodiments. For example, the device 700 can be a mobile phone, a computer, a digital broadcast terminal, a messaging device, a gaming console, a tablet, a medical device, exercise equipment, a personal digital assistant, and the like.

Referring to FIG. 7, the device 700 can include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules which facilitate the interaction between the processing component 702 and other components. For instance, the processing component 702 can include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 can include a power management system, one or more power sources, and any other components associated with the generation, management, and distribution of power in the device 700.

The multimedia component 708 includes a screen providing an output interface between the device 700 and the user. In some embodiments, the screen can include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 708 includes a front camera and/or a rear camera. The front camera and the rear camera can receive an external multimedia datum while the device 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal can be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons can include, but are not limited to, a home button, a volume button, a starting button, and a locking button.

The sensor component 714 includes one or more sensors to provide status assessments of various aspects of the device 700. For instance, the sensor component 714 can detect an open/closed status of the device 700, relative positioning of components, e.g., the display and the keypad, of the device 700, and the sensor component 714 can also detect a change in position of the device 700 or a component of the device 700, a presence or absence of user contact with the device 700, an orientation or an acceleration/deceleration of the device 700, and a change in temperature of the device 700. The sensor component 714 can include a proximity sensor configured to detect the presence of nearby objects without any physical contact. The sensor component 714 can also include a light sensor, such as a CMOS or CCD image sensor, for use in imaging applications. In some embodiments, the sensor component 714 can also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as Wi-Fi, 2G, 3G, 4G, 5G or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 704 including instructions, executable by the processor 720 in the device 700, for performing the above-described methods. For example, the non-transitory computer-readable storage medium can be a ROM, a RAM, a CD-ROM, a magnetic tape, a floppy disc, an optical data storage device, and the like.

Various embodiments of the present disclosure can include one or more of the following advantages.

By determining the currently running functions of the terminal and determining the current working mode of the terminal, the currently running functions are controlled, based on the current working mode of the terminal, to run in the running mode corresponding to the working mode. As such, the functions running between working modes can be isolated from each other.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A function controlling method, applied to a terminal provided with a first working mode and a second working mode, the method comprising:
   determining a currently running function of the terminal, and determining a working mode of the currently running function;
   controlling the function to run in a first running mode in a case that a current working mode is the first working mode; and
   controlling the function to run in a second running mode in a case that the current working mode is the second working mode;
   wherein the first running mode is different from the second running mode, and functions running in different working modes are isolated from each other,
   wherein the function further comprises network connection channel setting;
   the controlling the function to run in a first running mode comprises:
   setting a first network connection channel, which is a network connection channel used by an application to access the network in the first working mode; and
   the controlling the function to run in a second running mode comprises:
   setting a second network connection channel, which is a network connection channel used by an application to access the network in the second working mode and
   wherein the first working mode uses a dedicated access point network (APN) and the second working mode uses an Internet-type APN.

2. The function controlling method according to claim 1, wherein the function further comprises a call log storing function;
   the controlling the function to run in a first running mode comprises:
   storing a call log in a first call log database associated with the first working mode;
   the controlling the function to run in a second running mode comprises:
   storing a call log in a second call log database associated with the second working mode; and
   the first call log database is different from the second call log database.

3. The function controlling method according to claim 1, wherein the function further comprises function switch setting;
   the controlling the function to run in a first running mode comprises:
   acquiring a first function switch state recorded by the terminal, and setting a switch state of a function switch in the first working mode to the first function switch state corresponding to the first working mode; and the controlling the function to run in a second running mode comprises:

acquiring a second function switch state recorded by the terminal, and setting a switch state of a function switch in the second working mode to the second function switch state corresponding to the second working mode.

4. A function controlling device, applied to a terminal provided with a first working mode and a second working mode, the device comprising:

memory storing processor-executable instructions;

a processor configured to:

determine a currently running function of the terminal, and to determine a working mode of the currently running function; and control the function to run in a first running mode in a case that a current working mode is the first working mode, and to control the function to run in a second running mode in a case that the current working mode is the second working mode;

wherein the first running mode is different from the second running mode, and functions running in different working modes are isolated from each other, wherein the function further comprises network connection channel setting;

the processor is further configured to control the function to run in the first running mode by adopting:

setting a first network connection channel, which is a network connection channel used by an application to access the network in the first working mode; and the processor is further configured to control the function to run in the second running mode by adopting:

setting a second network connection channel, which is a network connection channel used by an application to access the network in the second working mode and wherein the first working mode uses a dedicated access point network (APN) and the second working mode uses an Internet-type APN.

5. The function controlling device according to claim 4, wherein the function further comprises a call log storing function;

the processor is further configured to control the function to run in the first running mode by adopting:

storing a call log in a first call log database associated with the first working mode;

the processor is further configured to control the function to run in the second running mode by adopting:

storing a call log in a second call log database associated with the second working mode; and the first call log database is different from the second call log database.

6. The function controlling device according to claim 4, wherein the function comprises function switch setting;

the processor is further configured to control the function to run in the first running mode by adopting:

acquiring a first function switch state recorded by the terminal, and setting a switch state of a function switch in the first working mode to the first function switch state corresponding to the first working mode; and the processor is further configured to control the function to run in the second running mode by adopting:

acquiring a second function switch state recorded by the terminal, and setting a switch state of a function switch in the second working mode to the second function switch state corresponding to the second working mode.

7. A non-transitory computer-readable storage medium having stored thereon computer-executable instructions for execution by a processing circuit to implement steps of the function controlling method according to claim 1.

8. The non-transitory computer-readable storage medium according to claim 7, wherein the function further comprises a call log storing function;

the controlling the function to run in a first running mode comprises:

storing a call log in a first call log database associated with the first working mode;

the controlling the function to run in a second running mode comprises:

storing a call log in a second call log database associated with the second working mode; and the first call log database is different from the second call log database.

9. The non-transitory computer-readable storage medium according to claim 7, wherein the function further comprises function switch setting;

the controlling the function to run in a first running mode comprises:

acquiring a first function switch state recorded by the terminal, and setting a switch state of a function switch in the first working mode to the first function switch state corresponding to the first working mode; and the controlling the function to run in a second running mode comprises:

acquiring a second function switch state recorded by the terminal, and setting a switch state of a function switch in the second working mode to the second function switch state corresponding to the second working mode.

10. A mobile terminal, comprising a liquid-crystal display (LCD) or an organic light-emitting diode (OLED) display touch screen, wherein the mobile terminal is configured to control the currently running function to run in the running mode corresponding to the working mode based on the current working mode of the terminal, and isolate functions running between different working modes; and the functions include at least one of short message storing, call log storing, function switch setting and network connection channel setting, and wherein the functions include network connection channel setting;

the different working modes include a first workspace mode using a dedicated access point network (APN) and a second workspace mode using an Internet-type APN;

the first workspace mode or the second workspace mode is identified with a user identification (UID); and the dedicated APN and the Internet-type APN are isolated from each other in the first and second workspace modes and access separate databases.

11. The function controlling method according to claim 1, wherein the function comprises a short message storing function;

the controlling the function to run in a first running mode comprises:

storing a short message in a first short message database associated with the first working mode;

the controlling the function to run in a second running mode comprises:

storing a short message in a second short message database associated with the second working mode; and the first short message database is different from the second short message database.

12. The function controlling device according to claim 4, wherein the function comprises a short message storing function;
- the processor is further configured to control the function to run in the first running mode by adopting the following manner:
- storing a short message in a first short message database associated with the first working mode;
- the processor is further configured to control the function to run in the second running mode by adopting the following manner:
- storing a short message in a second short message database associated with the second working mode; and
- the first short message database is different from the second short message database.

13. The non-transitory computer-readable storage medium according to claim 7, wherein the function comprises a short message storing function;
- the controlling the function to run in a first running mode comprises:
- storing a short message in a first short message database associated with the first working mode;
- the controlling the function to run in a second running mode comprises:
- storing a short message in a second short message database associated with the second working mode; and
- the first short message database is different from the second short message database.

* * * * *